(12) United States Patent
Sonnenberg (10) Patent No.: US 10,527,476 B2
(45) Date of Patent: Jan. 7, 2020

(54) ULTRASONIC FLOW METER HAVING A MAIN CHANNEL AND AT LEAST ONE SECONDARY CHANNEL

(71) Applicant: DIEHL METERING GMBH, Ansbach (DE)

(72) Inventor: Hans-Michael Sonnenberg, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 126 days.

(21) Appl. No.: 15/851,968

(22) Filed: Dec. 22, 2017

(65) Prior Publication Data

US 2018/0120139 A1    May 3, 2018

Related U.S. Application Data

(63) Continuation of application No. PCT/EP2016/000907, filed on Jun. 2, 2016.

(30) Foreign Application Priority Data

Jun. 24, 2015    (DE) .................. 10 2015 008 146

(51) Int. Cl.
  *G01F 1/66*   (2006.01)
  *G01F 7/00*   (2006.01)
  *G01F 1/58*   (2006.01)

(52) U.S. Cl.
  CPC .................. *G01F 7/00* (2013.01); *G01F 1/58* (2013.01); *G01F 1/662* (2013.01)

(58) Field of Classification Search
  None
  See application file for complete search history.

(56) References Cited

U.S. PATENT DOCUMENTS

| | | | |
|---|---|---|---|
| 4,282,751 A | 8/1981 | Brown et al. | |
| 6,272,920 B1 | 8/2001 | Tank et al. | |
| 2010/0084034 A1 | 4/2010 | Sonnenberg | |
| 2014/0230568 A1 | 8/2014 | Adachi et al. | |
| 2014/0352453 A1 | 12/2014 | Sonnenberg | |

(Continued)

FOREIGN PATENT DOCUMENTS

| | | |
|---|---|---|
| CN | 1263594 a | 8/2000 |
| CN | 1816735 A | 8/2006 |
| DE | 3032633 A1 | 3/1981 |

(Continued)

*Primary Examiner* — Harshad R Patel
(74) *Attorney, Agent, or Firm* — Laurence A. Greenberg; Werner H. Stemer; Ralph E. Locher (57) ABSTRACT

A flow meter has fluid flow through a measurement path in a measuring tube with a main channel and at least one secondary channel. A signal input device introduces a measurement input signal into the fluid and a signal detection device detects the measurement input signal and/or a response signal induced by the measurement input signal. For a predetermined fluid, the main and secondary channels with a first total throughput of the fluid per unit time and with a second total throughput of the fluid per unit time, which is greater than the first total throughput of the fluid per unit time. The ratio of the throughput through all the secondary channels to the throughput through the main channel is greater in the second total throughput than in the first total throughput of the fluid per unit time.

26 Claims, 9 Drawing Sheets

(56) References Cited

U.S. PATENT DOCUMENTS

2015/0253166 A1 9/2015 Yasuda et al.
2019/0113375 A1* 4/2019 Ploss ...................... G01F 1/662

FOREIGN PATENT DOCUMENTS

| DE | 4127695 A1 | 2/1993 |
| DE | 102007045101 A1 | 4/2009 |
| DE | 102008049891 A1 | 6/2010 |
| DE | 102009006733 A1 | 8/2010 |
| DE | 102009060516 A1 | 6/2011 |
| DE | 202014102258 U1 | 8/2014 |
| DE | 102013009347 A1 | 12/2014 |
| WO | 9953275 A1 | 10/1999 |
| WO | 2005005932 A1 | 1/2005 |
| WO | 2014057673 A1 | 4/2014 |

* cited by examiner

ULTRASONIC FLOW METER HAVING A MAIN CHANNEL AND AT LEAST ONE SECONDARY CHANNEL

CROSS-REFERENCE TO RELATED APPLICATION

This application is a continuation, under 35 U.S.C. § 120, of copending international application No. PCT/EP2016/000907, filed Jun. 2, 2016, which designated the United States; this application also claims the priority, under 35 U.S.C. § 119, of German patent application No. DE 10 2015 008 146.2, filed Jun. 24, 2015; the prior applications are herewith incorporated by reference in their entirety.

BACKGROUND OF THE INVENTION

Field of the Invention

The present invention relates to a flow meter for the flow measurement of flowing fluids. The fluid flows through a measurement path, which is located in a measuring tube and has, in at least one section, a main channel and at least one secondary channel. An input device introduces a measurement input signal into the fluid flowing through the main channel, and a detection device detects the measurement input signal and/or a measurement output signal induced by the measurement input signal.

A flow meter such as this is described in German published patent application DE 41 27 695 A1. The inductive flow meter described in that document comprises an at least approximately horizontally extending measuring tube which is to be permeated substantially parallel to a diameter by a magnetic field. The measuring tube respectively has at least one measuring electrode in its wall on both sides of the diameter. In a bottom region of the measuring tube, there is a trough, which extends approximately symmetrically with respect to the diameter and in the walls of which at least one additional measuring electrode is respectively provided. While in the case of larger measurement substance volumes the measurement substance flows primarily through the measuring tube, very small measurement substance volumes flow with an increased flow rate through the trough. In this way, a particularly accurate measurement of the measurement substance volume is possible even when the measurement substance volume is very small.

German published patent applications Nos. DE 10 2007 045 101 A1 and DE 10 2009 006 733, which was filed as an additional application thereto, disclose a flow meter in which two measurement paths separated from one another are provided, and wherein the fluid feed is supplied, as a function of the throughput or flow rate, on the one hand through the first or second measurement path and on the other hand through the first and second measurement paths. In one embodiment, the fluid feed is supplied by operation with the use of a switching device for example a switching valve. In another embodiment, the supply is carried out fluid-dynamically, i.e. on the basis of the force or the pressure of the fluid in the fluid feed. Thus, for instance, the fluid can flow as a function of the throughput, without operation of switching means quantities, as a function of gravity first into the second measurement path and, in the event of an increased throughput, into the first and second measurement paths.

BRIEF SUMMARY OF THE INVENTION

It is accordingly an object of the invention to provide a flow meter which overcomes the above-mentioned and other disadvantages of the heretofore-known devices and methods of this general type and which provides for a new type of flow meter, which, with a simple and compact structure, has a particularly high dynamic measurement range, i.e. it reliably determines the throughput of a fluid per unit time in a particularly large range extending between very low flow rates and very high flow rates.

With the foregoing and other objects in view there is provided, in accordance with the invention, a flow meter for flow measurement of flowing fluids, the flow meter comprising:

a measuring tube defining a measurement path through which a fluid flows, the measuring tube having, in at least one section thereof, a main channel and at least one secondary channel;

an input device for introducing a measurement input signal into the fluid flowing through the main channel;

a detection device configured to detect the measurement input signal and/or a measurement output signal induced by the measurement input signal;

wherein, for a predetermined fluid, the fluid flows through the main channel and through the at least one secondary channel with a first total throughput of the fluid per unit time and with a second total throughput of the fluid per unit time, which is greater than the first total throughput of the fluid per unit time; and wherein a ratio of the throughput per unit time through the at least one secondary channel to the throughput per unit time through the main channel is greater for the second total throughput of the fluid per unit time than for the first total throughput of the fluid per unit time.

Because, in the case of a higher total throughput of the fluid per unit time, a lower proportion of the fluid flows through the main channel than in the case of a low total throughput of the fluid per unit time, but the main channel and secondary channels are flowed through simultaneously, in particular flowed through over the entire cross section, a single measuring device is sufficient, namely the input device and the detection device, which detect only the flow rate of the fluid in the main channel: the relationship between the flow rate in the main channel and the throughput of fluid per unit time is not proportional but sub proportional. In this way, an increased dynamic measurement range can be achieved, without having to provide a plurality of measuring devices for this purpose.

Preferably at least two secondary channels are provided, which respectively have a smaller cross section than the main channel. Because of the smaller cross sections of the secondary channels, a fluid-mechanical displacement of the fluid quantity takes place which is then dependent on the total fluid quantity.

Preferably, the secondary channels are arranged around the main channel, for example in a number of from four to twelve.

It has proven expedient for the ratio of the sum of the cross sections of all the secondary channels to the cross section of the main channel to be between 20:80 and 80:20, preferably between 30:70 and 70:30, particularly preferably between 40:60 and 60:40, more particularly preferably between 45:55 and 55:45. In a most preferred embodiment of the invention, the ratio is substantially 50:50.

In this way, the average Reynolds number in the main channel and secondary channels can be increased by a factor of more than 2, for example between 3 and 5, in particular 4, compared with the situation with a single channel which has the same total cross section.

By suitable selection of the shape and size of the secondary channels (particularly in terms of the respective smallest dimension in the cross section), their inner surface and their arrangement relative to one another and to the main channel, it is possible to ensure that, in the case of a predetermined throughput of the fluid per unit time in the secondary channels, the fluid flow changes from a laminar flow to a turbulent flow, so that because of the turbulence at a higher flow rate of the fluid in the arrangement, relatively more fluid flows through the secondary channels. For instance, it is advantageous for the diameter of the main channel to be in the ratio of between 2.5 and 6, preferably between 4 and 5, to a diameter, measured in the radial direction, of a secondary channel (or a smallest wall spacing in the case of a gap-shaped secondary channel).

Particularly advantageously, at least a first part of the secondary channels is separated from the main channel by a wall. In this way, the geometry of the secondary channel may be suitable in general, and may be configured substantially independently of the properties of the main channel.

In this embodiment, it is particularly expedient for the wall which separates the first part of the secondary channels from the main channel to be present along the total measurement path. On the other hand, it is not compulsory that the walls which separate the secondary channels of the first part of the secondary channels from one another also extend along the entire measurement path. Rather, it is for example sufficient to provide such walls between the secondary channels in an initial section and an end section of the measurement path, but to let the fluid outside the main channel flow more freely in an intermediate region. With a suitable selection of the length of the initial section and of the end section relative to the smallest cross-sectional dimension (or to the smallest wall spacing) of a secondary channel, it is possible to achieve the desired property that, in the case of a higher flow rate, less fluid regarded relatively flows through the main channel than through the secondary channels. In particular, the above-described transition between laminar and turbulent flow through the secondary channels should be achieved within the desired dynamic measurement range.

As an alternative, a part of the secondary channels may be configured as an indentation adjacent to the main channel, in particular as a radial gap adjacent to the main channel. This may involve all the secondary channels or a second part of the secondary channels, which is different to the aforementioned first part of the secondary channels. A laminar flow is then achieved in particular, even in the case of high flow rates, when the corresponding channel has more or less the same dimension in all directions. The lower the rotational symmetry of the respective channel is, the earlier the transition from laminar to turbulent flow can take place.

Preferably, the cross-sectional shape of the secondary channels widens from the outside inward toward the main channel, and is preferably substantially configured trapezoidally. This has the advantage that clogging of the secondary channels is prevented. Preferably, the side faces of the secondary channels have an angle with respect to the mid-axis of the secondary channel in the range of from 5° to 20°, particularly preferably from 9° to 16°. Expediently, the width-to-height ratio of the secondary channels is at least substantially 1:1. Preferably, the corners in and on the secondary channels are rounded, which allows on the one hand improved flow guidance and on the other hand simplified production in the scope of an injection-molding process.

Correspondingly, in one preferred embodiment, the main channel (in which a turbulent flow is desired over the entire dynamic measurement range) has substantially the same dimension in two predetermined mutually perpendicular directions, the main channel preferably having a circular or square cross section. On the other hand, at least a part of the secondary channels is configured with different dimensions in two different directions, a secondary channel preferably having a non-square but rectangular cross section, i.e. a rectangular cross section in which the rectangle has different side lengths, in particular side lengths differing by a factor of between 1.2 and 5, preferably by a factor of more than 3. As an alternative, a secondary channel may have a trapezoidal cross section. At least a part of the secondary channels may also have a cross section which is annular or in the shape of a ring segment. In one preferred embodiment, the main channel is arranged annularly symmetrically with respect to an axis of the flow meter (i.e. approximately with a circular cross section), and the secondary channels are distributed annularly around the main channel.

The flow meter according to the invention may be implemented in two main embodiments:

It may be configured as an ultrasonic meter, in which a pair of ultrasound transducers provide the function of the input device and of the detection device; each ultrasound transducer introduces a signal into the fluid in the main channel and at the same time detects the signal from the other respective ultrasound transducer.

In a known way, part of the measurement path may in this case be provided by a tube insert which has two attachments, each with an ultrasound-reflecting surface, which direct ultrasound from the transducers into the main channel. (The main channel is in this case formed in the tube insert, as are the secondary channels.)

In the second embodiment, the flow measurement is carried out by means of magnetic induction. In this case, the input device is configured as a magnetic field-generating electrical coil, and the detection device is provided by an electrode arrangement.

In the case of embodiments suitable for conventional fluids (for example water), the secondary channels are of such a size that they should be protected against clogging with the aid of a filter 50 for particles, i.e. for instance as a screen in the inlet, the openings of which are smaller than or equally large as the smallest cross-sectional dimensions of the secondary channels.

According to one advantageous configuration of the present invention, the secondary channels extend at least substantially over the entire length of the main channel, or over the entire length of the measuring tube. This provides advantages in terms of both flow technology and production technology.

Expediently, the main channel and the secondary channels are configured as a one-piece component, preferably as a one-piece molded part, particularly preferably as a one-piece injection-molded part. The entire measuring tube may therefore be produced in a single injection-molding process.

It is advantageous for the component to be shaped conically in its longitudinal direction in terms of its outer side (and preferably also in terms of its inner side). In this case, an angle with respect to the longitudinal mid-axis of from 0.3° to 1.2° is preferably provided.

By virtue of the fact that the mold release plane extends, preferably centrally, through two opposite secondary channels, the measuring tube can be produced without large material build-ups in the outer region between the secondary channels.

Preferably, secondary channels are provided in an even number along the circumference of the measuring tube, preferably four, six or eight secondary channels. Substantially uniform wall thicknesses can be provided in this way, which is advantageous for the injection-molding process.

By virtue of the fact that the flow meter has a housing with an inner wall, and fluid is located in a region between the inner wall of the housing and an outer wall of the measuring tube comprising the main channel and the secondary channels, acoustic reflections are advantageously avoided when using the ultrasound measuring technique.

Preferably, in this case, a circumferential collar-like projection to ensure connection of the measuring tube to the housing is provided on the rear side of the measuring tube. In particular, this allows sealing of the measuring tube with respect to the housing, and at the same time separation in order to form the intermediate region. In this case, the projection may lie in a region along the longitudinal axis of the measuring tube. In the region of the inlet and/or outlet of the measuring tube, rib-like projections may additionally be provided, which fix the measuring tube with respect to the housing but allow fluid to flow in between them.

According to one expedient configuration of the present invention, the measuring tube is enclosed by a measuring tube holder, the measuring tube holder comprising at least two longitudinal shells which fix the measuring tube and/or the reflectors. This makes it possible to insert the measuring tube, together with the measuring tube holder, into the housing from the end as a mounting unit which is easy to handle (optionally in an automated fashion).

Preferably, the measuring tube holder has at least one web, preferably a multiplicity of webs, which is or are arranged in such a way that it/they do(es) not fluidically obstruct the at least one secondary channel.

Other features which are considered as characteristic for the invention are set forth in the appended claims.

Although the invention is illustrated and described herein as embodied in a flow meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
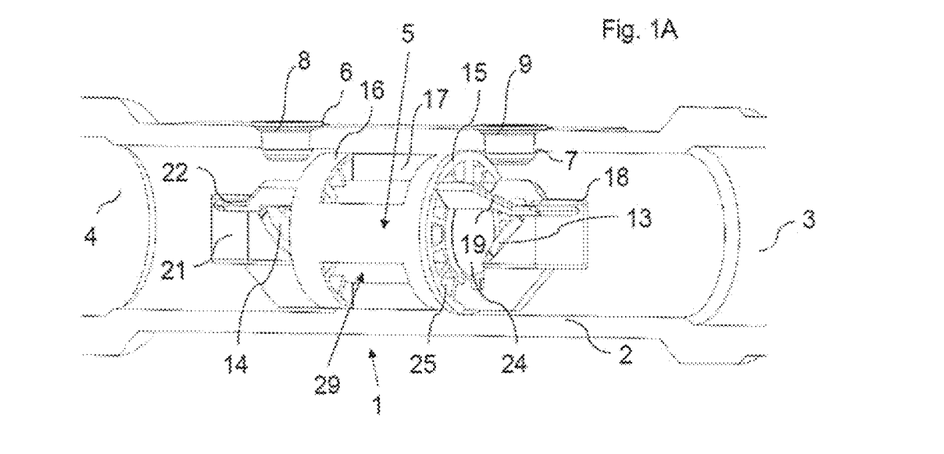
FIG. 1A is a perspective view with a partially open outer tube of an ultrasonic meter as an example of a meter in a first exemplary embodiment of the invention.
Figure 5:
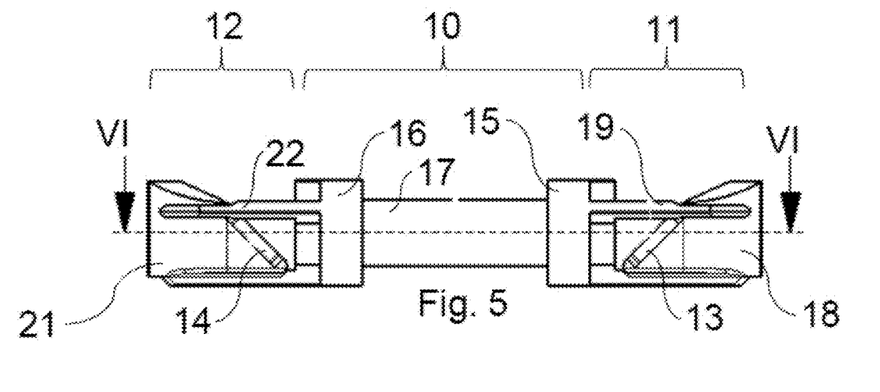
FIG. 5 shows a side view of an insert which may be provided in the ultrasonic meter according to the invention as in FIG. 1.
Figure 6:
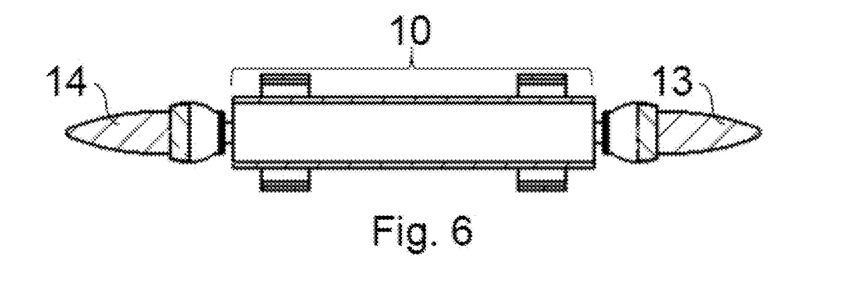
FIG. 6 is a cross-section through the insert of FIG. 5 taken along the section VI-VI.
Figure 7:
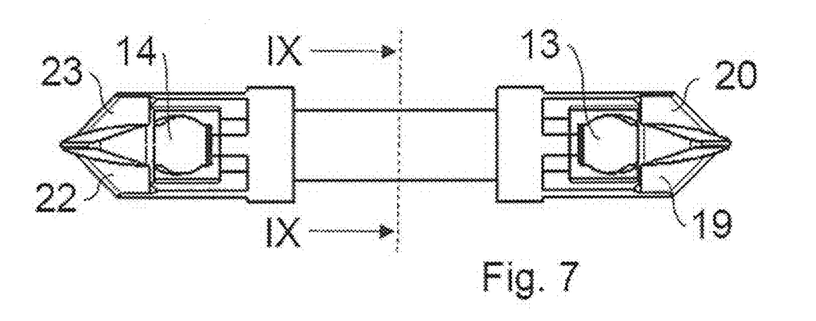
FIG. 7 shows the insert of FIG. 5 in plan view.
Figure 8:
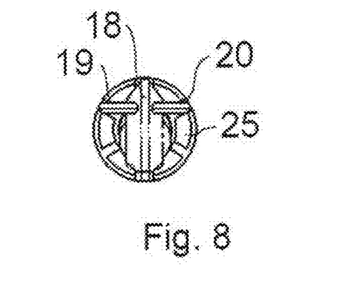
FIG. 8 shows the insert of FIG. 5 in front view.
Figure 9:
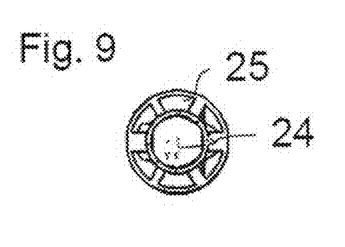
FIG. 9 is a cross-section through the insert of FIG. 5 taken along the section IX-IX indicated in FIG. 7.

Referring now to the figures of the drawing in detail and first, particularly, to FIG. 1 thereof, there is shown an exemplary flow meter 1 according to the invention, here in the embodiment of an ultrasonic meter. The ultrasonic meter is used to determine the throughput of a flowing medium, in particular a liquid or gas. As represented in FIG. 1, the ultrasonic meter 1 comprises a housing 2, conventionally consisting of metal, with an inlet 3 and an outlet 4, which are respectively connected to a non-illustrated pipeline system. A measurement insert 5 is arranged in the housing 2. An ultrasound transducer 8, 9 is respectively arranged in openings 6 and 7 of the housing 2. As can be seen from FIGS. 5 to 7, the measurement insert 5 comprises a measuring tube 10 with two attachments 11 and 12 on the fluid entry side and the fluid exit side of the measuring tube 10. A reflective plane 13 is provided on the attachment 11, and a reflective plane 14 is provided on the attachment 12.

Together with the reflective planes 13, 14, the ultrasound transducers 8, 9 form a U-shaped measurement path.

The measurement of the throughput is carried out, for example, according to the so-called differential time-of-flight method. To this end, ultrasound signals are respectively emitted and received alternately by the ultrasound transducers 8, 9, the time-of-flight difference is established and the flow rate of the flowing medium, and as a function thereof the flow volume, are determined therefrom.

What is involved here is determining the flow volume, i.e. the throughput, per unit time over a value range which is as large as possible, namely over several orders of magnitude of the value.

In conventional ultrasonic meters, a single channel is provided for the fluid, there conventionally being a turbulent flow over the value range. In this way, the flow volume per hour in the measurement range is proportional to the (average) flow rate. Therefore, the greater the desired measurement range for the flow volume per unit time is, the more sensitively flow rate needs to be measured.

The ultrasonic meter 1 according to FIG. 1 has the property that the flow volume per unit time, or the throughput per unit time, is no longer proportional to the flow rate of the fluid as in the case of a single channel, but instead a relatively small range of flow rates may comprise the same range of flow volumes per unit time. Here, this is achieved in that, although the measurement is carried out with respect to a fluid flowing through the main channel 24, the fluid may however also flow through secondary channels 25, in which the fluid behaves differently as a function of the flow volume per unit time to be detected.

In detail, a main channel 24 and secondary channels 25 are formed in an initial section 15 of the measuring tube (with a shoulder for fixing the measurement insert) and also in an end section 16 of the measuring tube. Between them, there is an intermediate region 17 in which the fluid from a plurality of secondary channels 25 of the initial section 15 is combined before it is separated again by the secondary channels 25 of the end section 16. The lengths la, lb are selected in proportion to the diameter $d_2$ so that a laminar flow is promoted in the secondary channels.

Good distribution of the fluid is ensured by a central distributor blade 18, on which the reflective plane 13 is formed, as well as side wings 19 and 20 on the attachment 11. A blade 21 and wings 22, 23 on the attachment 12 correspond to these.

The invention will be explained in more detail below with the aid of FIG. 2, in which essentially the same principle is implemented as in FIG. 1A, but with fewer secondary channels.

Figure 1B:
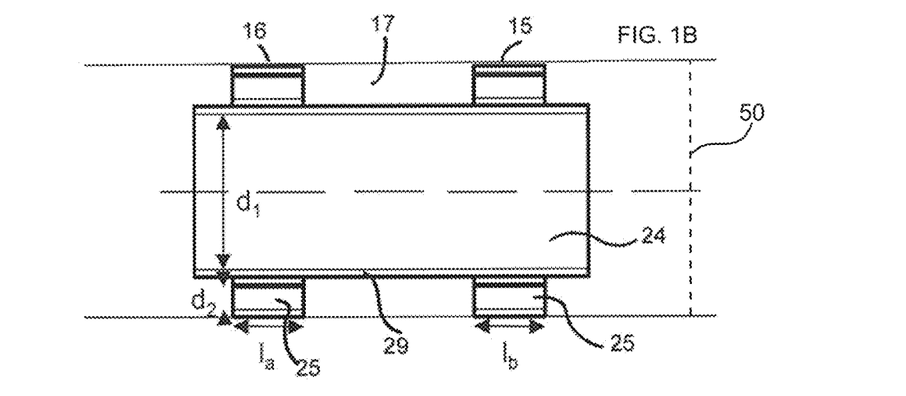
FIG. 1B shows a sectional view of the ultrasonic meter of FIG. 1A with references for some of the relevant dimensions.
Figure 2:
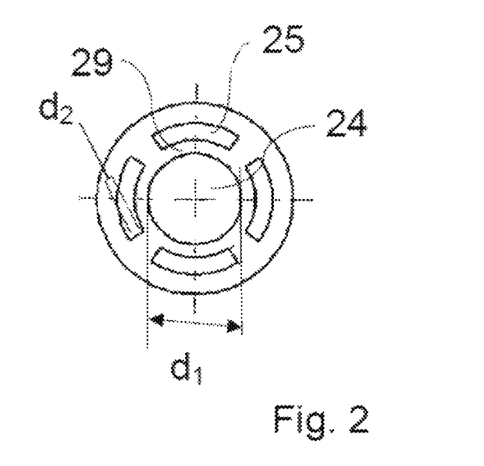
FIG. 2 shows an arrangement of a main channel and four secondary channels, which may be used as an alternative in the ultrasonic meter of FIG. 1.

According to FIG. 1B or 2, a main channel 24 is provided, which has for example an internal tube diameter $d_1$ of 11.5 mm. Four secondary channels 25 are provided, which together form an annular gap with four segments, the segments together providing 270° of a full circle. The segments have a radial dimension $d_2$ of 2.1 mm. The ratio of $d_1$ to $d_2$ is preferably between 2.5 and 6, particularly preferably 3.5 or 4 to 5.

The main channel 24 therefore has a cross-sectional area of almost 104 mm2, and the four secondary channels 25 together have a cross-sectional area of about 84 mm$^2$. The secondary channels 25 therefore together comprise almost 80% of the cross-sectional area of the main channel 24. Each secondary channel 25 per se has a relatively small cross-sectional area in comparison with the main channel 24.

By virtue of the shape of the secondary channels 25, and the lengths $l_a/l_b$ which can be seen in FIG. 1b with $l_{a,b}/d_2 \geq 1.5$ to 2, a turbulent flow does not occur there until there are medium flow volumes per unit time. With low flow volumes per unit time, a laminar flow is formed. In the main channel 24, there is a turbulent flow substantially with all flow volumes per unit time of the measurement range (the flow in the main channel 24 can also be laminar only with very low flow rates).

In the case of a laminar flow, the respective flow volume is dependent to the fourth power on the diameter. In the case of a turbulent flow, the flow volume per unit time is dependent on the second power of the diameter, i.e. essentially on the cross section. This means that the throughput in the case of laminar flow depends much more strongly on the diameter of the flow channel than in the case of turbulent flow. The throughput of a laminar flow is therefore reduced to one sixteenth when the channel diameter is halved, while it merely decreases to one fourth in the case of turbulent flow. The flow rate (the ratio of flow volume per unit time and flow cross section) is correspondingly independent of the channel diameter in the case of turbulent flow, while in the case of laminar flow it depends on the square of the diameter.

Because of the transition in the secondary channel 25 from laminar to turbulent flow when the total flow volume per unit time increases, the distribution of the total flow volume per unit time (which corresponds to a particular throughput per unit time) is displaced from the main channel 24 to the secondary channels 25. With very low total flow volumes per unit time of for instance 5 l/h, the average flow rate of the fluid in the secondary channels 25 is only 15% of the average flow rate of the fluid in the main channel 24. In other words, it is ensured that a relatively large amount of fluid flows through the main channel when the total flow volume per unit time is low overall. This is desirable since the measurement in the case of low total flow volumes per unit time is thereby facilitated. When the turbulent flow begins, the differences between the main channel 24 and the secondary channels 25 disappear, as regards the average speed of the fluid flowing through them. At a total flow volume per unit time of 5000 l/h, the fluid in the secondary channels 25 reaches about 95% of the speed of the fluid in the main channel 24.

The transition from laminar to turbulent may be demonstrated with the aid of the Reynolds number. In the exemplary case in FIG. 2 with the aforementioned dimensions, the Reynolds number in the secondary channels 25 (gap width $d_2$ of about 2 mm) develops from the value 5 at a total flow volume of 5 l/h, through the value 60 at a total flow volume of 50 l/h and the value 1440 at a total flow volume of 500 l/h, to a value of about 16000 at a total flow volume of 5000 l/h. Particularly at low total flow volumes, the Reynolds number increases super proportionally.

Figure 3:
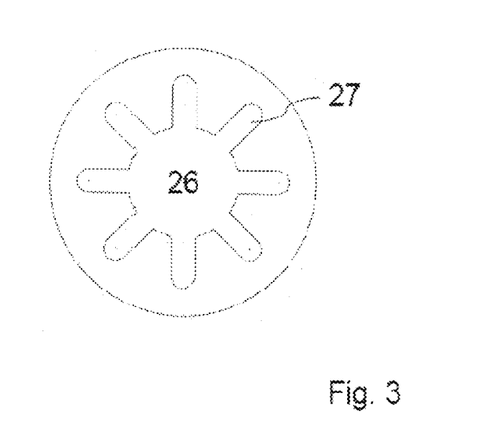
FIG. 3 shows an arrangement of a main channel and eight secondary channels adjacent thereto as radial gaps, which may likewise be used as an alternative in the ultrasonic meter of FIG. 1.

FIG. 3 shows an alternative arrangement of the main channel 26 and secondary channels 27: here, the secondary channels 27 are formed as radial gaps departing from the main channel 26. In the exemplary case of FIG. 3, eight radial gaps are provided on the main channel 26. Even in the absence of a wall separating the secondary channels 27 from the main channel 26, the above-described effect occurs, in which a laminar flow is formed initially in the secondary channels 27 and the flow in the secondary channels 27 also becomes turbulent at higher flow volumes per unit time, so that a relatively larger amount of fluid can flow through the secondary channels 27.

Figure 4:
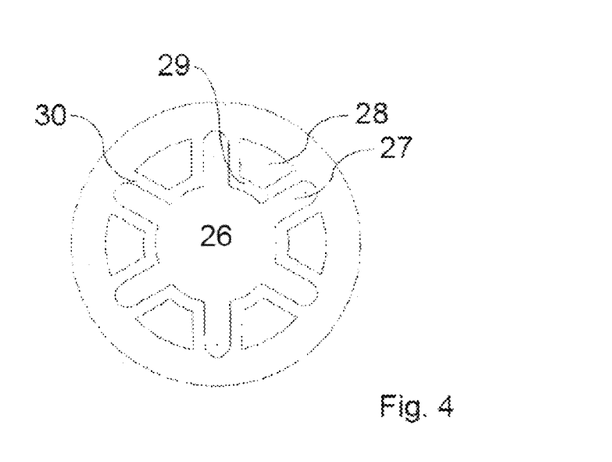
FIG. 4 shows an arrangement of a main channel and six secondary channels adjacent thereto as a radial gap, as well as six further secondary channels with a separating wall from the main channel, which may likewise be used as an alternative in the ultrasonic meter of FIG. 1.

In another embodiment of the arrangement of the main channel 26 and secondary channels 27, 28 according to FIG. 4, a first part of the secondary channels 28 is separated from the main channel 26 by a wall 29, and a second part of the secondary channels 27 is provided as a radial gap which merges into the main channel 26 without a wall. The secondary channels 27 and 28 are separated from one another by walls 30.

In summary, it will be pointed out that, in the ultrasonic meter proposed here as an example of a flow meter, the measurement is carried out exclusively through the main channel 24 or 26. The secondary channels 25 or 27 or 28 have the purpose of transforming a measurement range for the flow volume per unit time onto a measurement range which is as small as possible for the fluid speed in the main channel 24. By the mere presence of the secondary channels 25, 27, 28, the principle of pure proportionality between flow volume per unit time and flow rate of the fluid in the channel associated with the measurement path is broken in favor of a higher measurement range.

Figure 10:
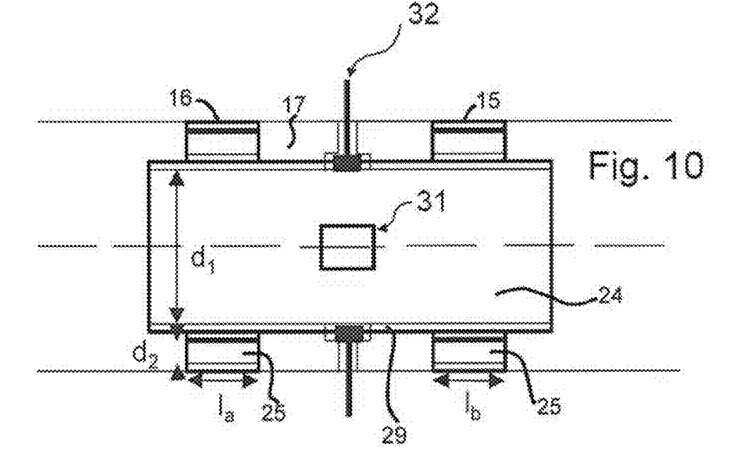
FIG. 10 shows a variant of the meter of FIG. 1A configured as a magnetic induction meter.

The invention may likewise be applied to flow meters in which a time-varying magnetic field is coupled in by means of a coil, and a magnetic voltage thereby induced is detected at electrodes as a signal detection device as a response signal occurring as a result of the measurement signal. To this end, FIG. 10 shows a representation according to FIG. 1A, except that a coil 31 is provided centrally instead of the ultrasound transducer, the main channel carrying a measurement electrode 32 in the region of its wall 29.

Figure 11A:
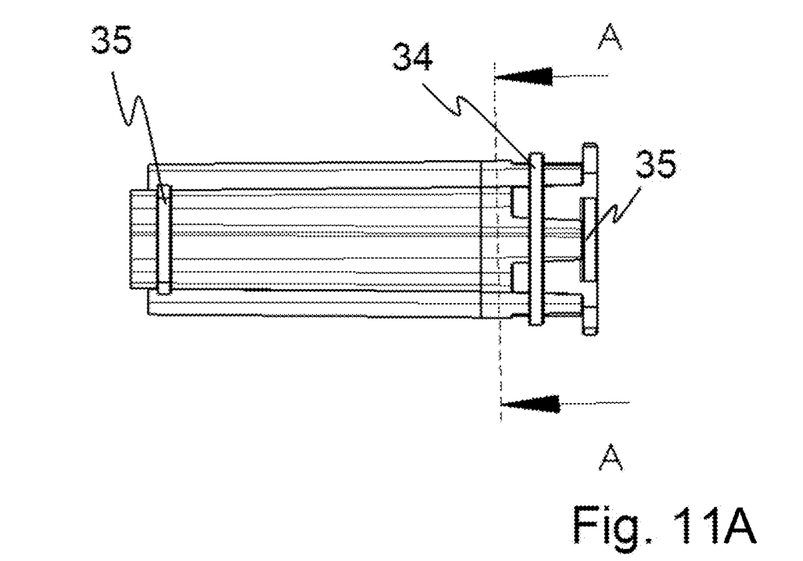
FIGS. 11A, 11B and 11C show a measuring tube according to another configuration of the present invention in a side view (FIG. 11A), in sectional view (FIG. 11B) in the viewing direction A-A of FIG. 11A, and in perspective representation (FIG. 11C)

FIG. 11A shows another expedient configuration of a measuring tube 10 of the present invention. The measuring tube 10 is preferably formed in one piece and provided with a slight conicity outward (and also preferably inward) along its longitudinal axis. The conicity preferably lies in the range of from 0.3° to 1.2° with respect to the longitudinal mid-axis of the measuring tube 10. The measuring tube 10 preferably comprises a fully circumferential collar-like projection 34 (cf. also FIG. 11C), which is arranged in the vicinity of the inlet. In the region of the outlet, the measuring tube 10 has a rib-like projection 35 on each side, so that water can flow in between the housing (not represented in FIG. 11A) and the outer side of the measuring tube 10. The circumferential projection 34 seals the measuring tube 10 from the housing. Rib-like projections 35 may also be provided in the region of the inlet, if required.

Figure 11B:
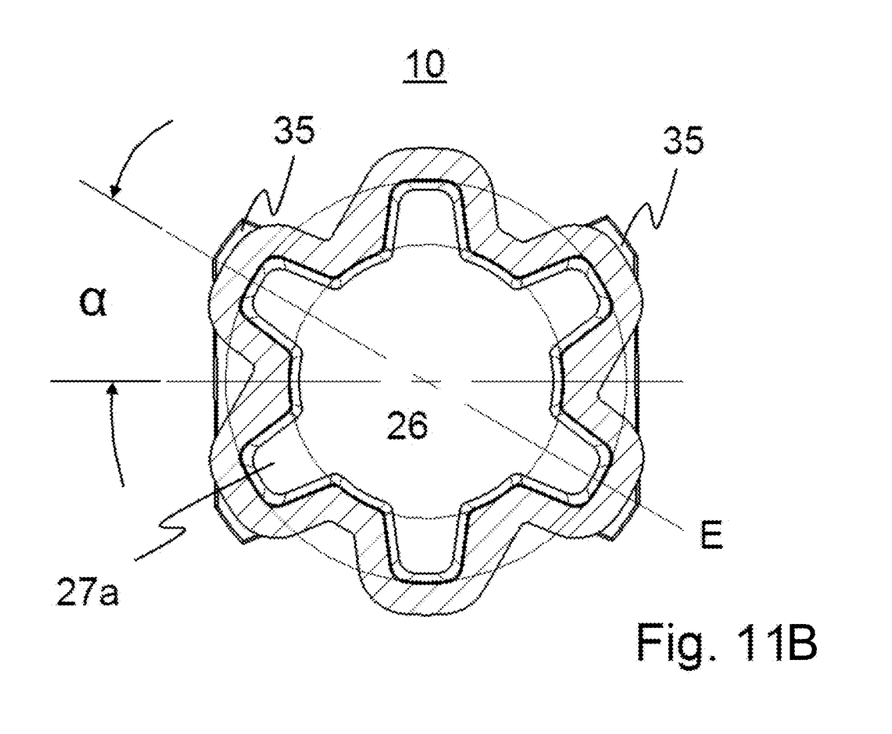
Figure 11C:
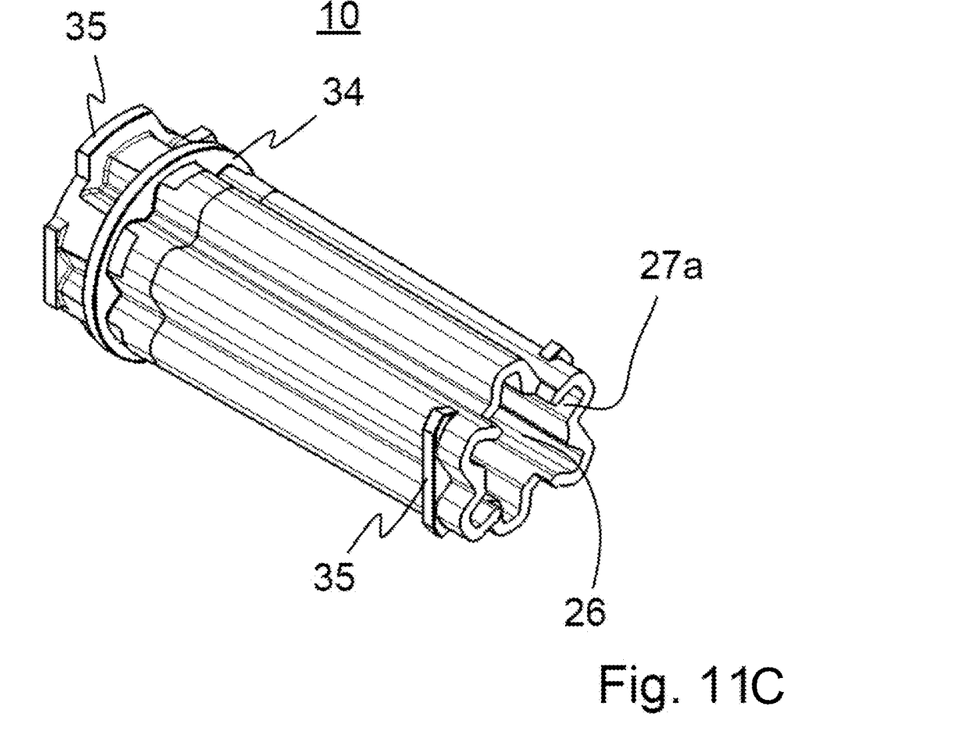

As revealed by FIG. 11B, the cross-sectional shape of the secondary channels 27a widens from the outside inward toward the main channel 26, and is preferably substantially configured trapezoidally. This has the advantage that clogging of the secondary channels 27a is prevented. The side faces of the secondary channels have an angle of preferably from 5° to 20°, particularly preferably from 9° to 16°, with respect to the central normal of the respective secondary channel 27a. Corner regions in the region of the cavity of the secondary channel 27a and in the transition region of the secondary channel 27a to the main channel 26 are rounded (preferably with a radius of from 0.2 mm 0.5 mm.

The width-to height ratio of the secondary channels 27a is at least substantially preferably about 1:1.

In FIG. 11B, the line E shows the mold release plane, which is preferably inclined by an angle α (for example 30°). The effect achieved by this is that no sizeable material build-ups are necessary in the outer region of the measuring tube 10, since the measuring tube 10 can be released easily from the mold.

Figure 12:
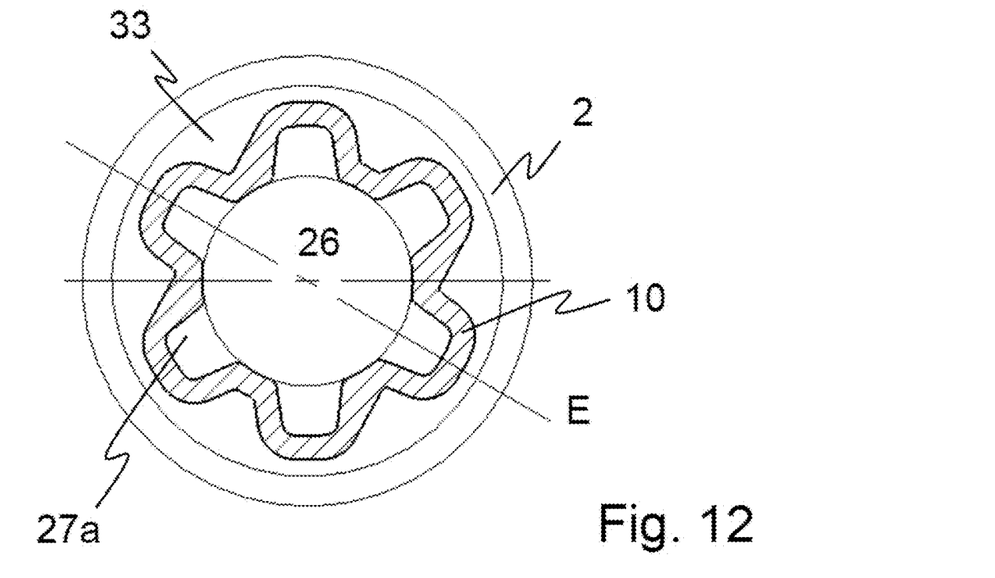
FIG. 12 shows a highly simplified schematic cross-sectional representation of the measuring tube according to FIG. 11 in the state inserted into the housing.

FIG. 12 shows the installation situation of the aforementioned configuration of the measuring tube 10 in a greatly simplified schematic representation. Between the housing 2 and the measuring tube 10, as a result of the collar-like fully circumferential projection 34, a distance from the housing 2 is provided, this distance forming a region 33 in which there is fluid. Acoustic reflections back into the measurement channel can be prevented in this way, since ultrasound signals entering the water-filled region 33 are eliminated, or die away, in this region.

Figure 13A:
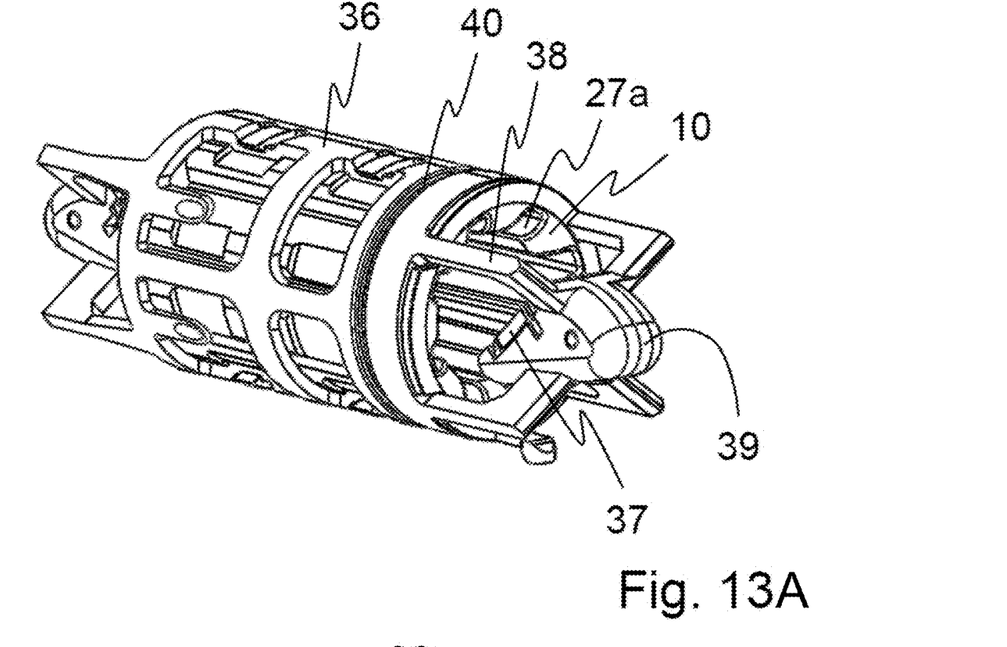
FIGS. 13A and 13B show another configuration, in which the measuring tube according to FIG. 11 is fitted in a two-piece measuring tube holder, in perspective representation (FIG. 13A) and in front view (FIG. 13B)
Figure 13B:
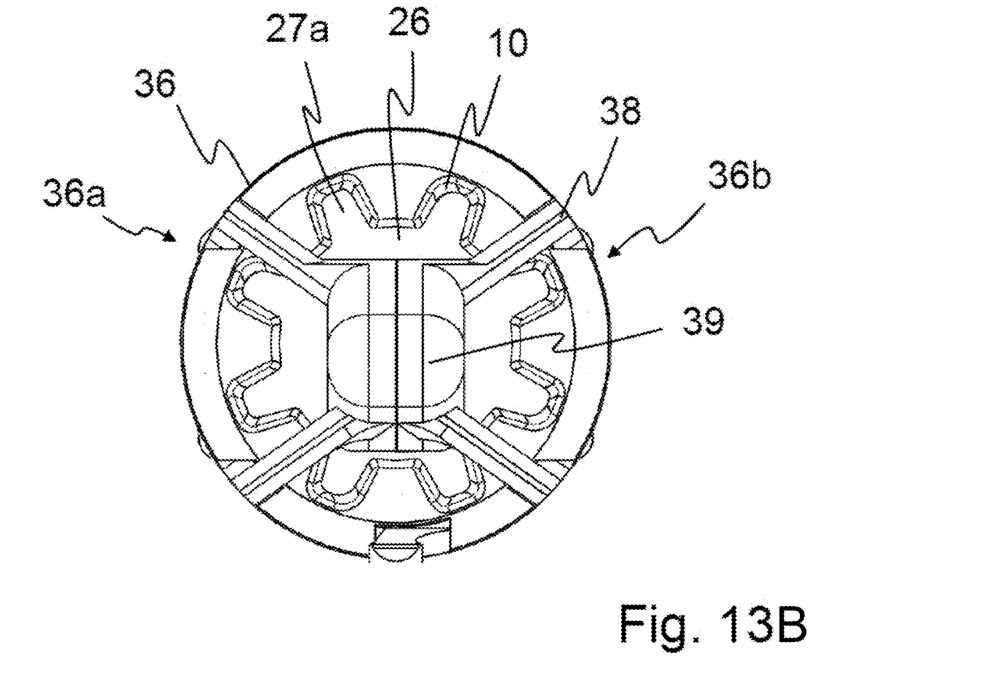

In the configuration shown in FIG. 13A, the measuring tube 10 is enclosed on the outside by a measuring tube holder 36. The measuring tube holder 36 consists of two shells, or longitudinal shells 36a, 36b, divided along the longitudinal axis of the measuring tube (cf. FIG. 13B). The respective longitudinal shells 36a, 36b may, preferably as an integral part, comprise webs 38 and a further region, in which case the latter together with the region of the opposite longitudinal shell may form a reflector holder 39, which carries a reflector 37. The reflector holder 39 may be configured in the shape of flow lines on its respective front side. The measuring tube holder 36 and the measuring tube 10 are positioned with respect to one another so that the webs 38 of the measuring tube holder 36 do not fluidically obstruct the secondary channels 27a.

In the outer region of the measuring tube holder 36, there is a circumferential groove 40 for insertion of a circumferential seal (not illustrated in FIG. 13A).

Figure 14A:
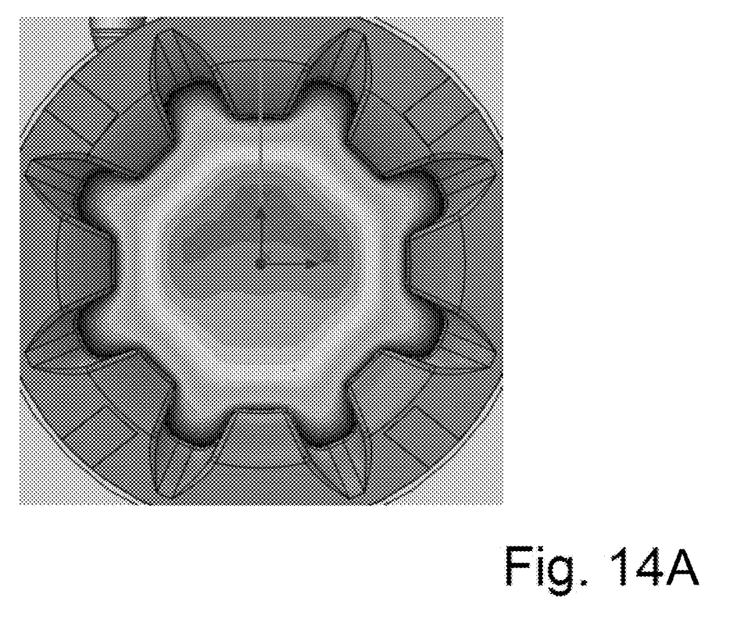
FIGS. 14A and 14B show a flow simulation in a sectional representation through the measuring tube in the case of low throughput (FIG. 14A) and in the case of high throughput (FIG. 14B)
Figure 14B:
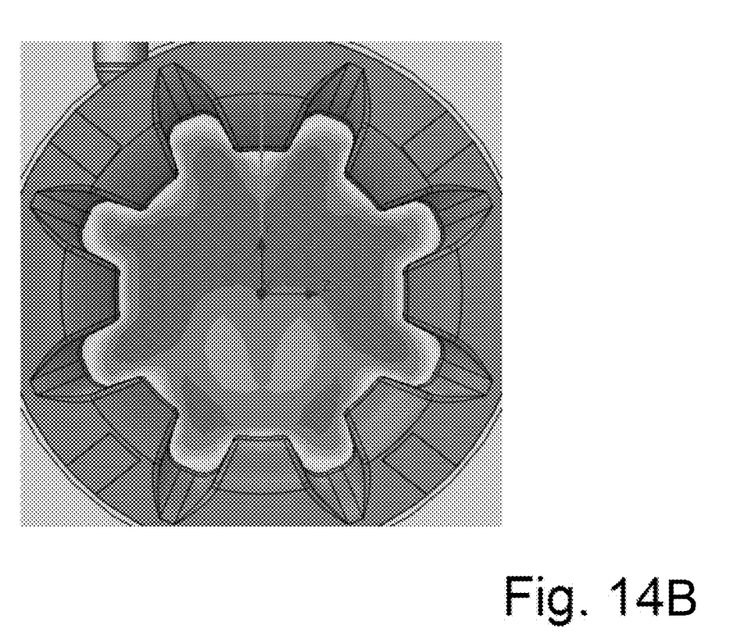

The fluid-mechanical effect of the present invention is reproduced pictorially in FIGS. 14A and 14B. FIG. 14A shows the flow profile in the case of a flow Q1, which is less than the flow Q2 represented in FIG. 14B. Because of the presence of the secondary channels, a laminar layer flow is formed in the region of the secondary channels, which communicates with the flow in the main channel. Merely a fraction of 5-10% of the flow rate forms in this case in the secondary channels, compared with the middle of the main channel. This may be equated with a cross-sectional constriction, and increases the flow in the measuring tube, or in the main channel, by up to 50%. The flow is therefore concentrated in the center of the main channel in FIG. 14A.

In the case of a high flow Q2, turbulent flows occur in the secondary channels, so that an approximately equally distributed flow is set up (cf. 14B). In this case, the flow in the secondary channels has approximately the same speed (about 70%) as in the middle of the main channel, and reduces the flow rate and therefore the pressure loss. As a result of this hydrodynamic displacement, a larger dynamic measurement range can be achieved.

Figure 15:
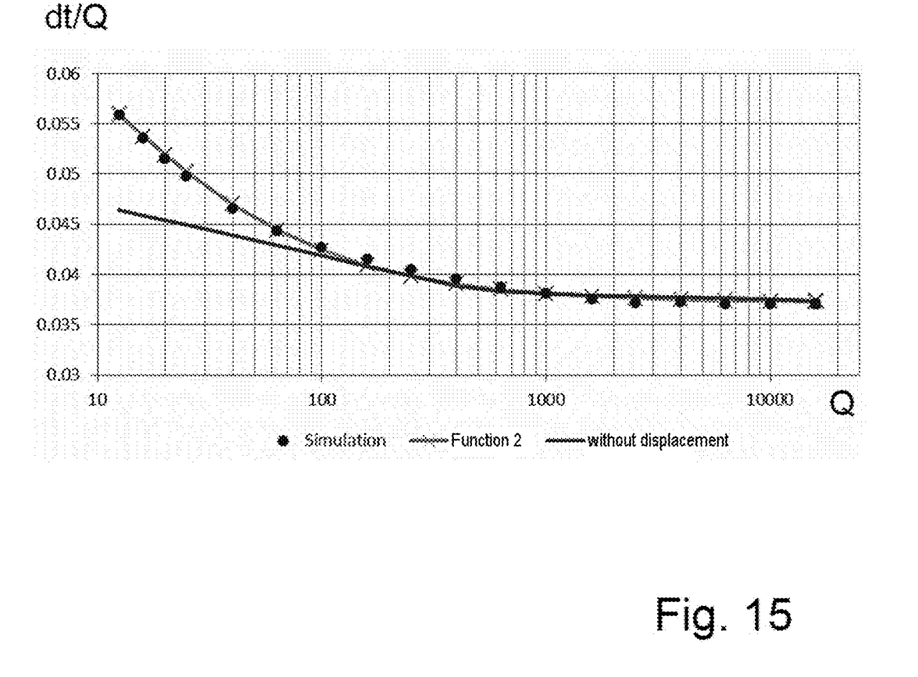
FIG. 15 shows a representation of the ratio of time-of-flight difference/throughput relative to the throughput in a measuring tube according to the invention in comparison with a conventional measuring tube with a circular diameter.

The effect of this hydrodynamic displacement is very considerable, and may be seen from the representation according to FIG. 15. In FIG. 15, the measurement effect, i.e. the ratio (time-of-flight difference dt/throughput Q) is plotted against the throughput Q. The increased measurement effect for a throughput of between 10 and 100 in comparison to a measuring tube with a circular cross section is clear. The additional measurement effect allows higher time-of-flight differences for the same throughput. This means that, for the same time-of-flight difference dt, a lower throughput can be measured. This increases the dynamic measurement range of the flow meter very extraordinarily.

The following is a summary list of reference numerals and the corresponding structure used in the above description of the invention:

1 ultrasonic meter
2 housing
3 inlet
4 outlet
5 measurement insert
6 opening
7 opening
8 ultrasound transducer
9 ultrasound transducer
10 measuring tube
11 insert
12 insert
13 reflective plane
14 reflective plane
15 initial section
16 end section
17 intermediate region
18 distributor blade
19 side wing
20 side wing
21 distributor blade
22 side wing
23 side wing 24 main channel
25 secondary channel
26 main channel
27 secondary channel
27a secondary channel
28 secondary channel
29 wall
30 wall
31 coil
32 measurement electrode
33 region
34 circumferential projection
35 rib-like projection
36 measuring tube holder
36a longitudinal shell
36b longitudinal shell
37 reflector
38 web
39 reflector holder
40 sealing groove
E mold release plane

The invention claimed is:

1. A flow meter for flow measurement of flowing fluids, the flow meter comprising:
a measuring tube defining a measurement path through which a fluid flows, said measuring tube having, in at least one section thereof, a main channel and at least one secondary channel;
an input device for introducing a measurement input signal into the fluid flowing through said main channel;
a detection device configured to detect the measurement input signal and/or a measurement output signal induced by the measurement input signal;
wherein, for a predetermined fluid, the fluid flows through said main channel and through said at least one secondary channel with a first total throughput of the fluid per unit time and with a second total throughput of the fluid per unit time, which is greater than the first total throughput of the fluid per unit time; and
wherein a ratio of the throughput per unit time through said at least one secondary channel to the throughput per unit time through said main channel is greater for the second total throughput of the fluid per unit time than for the first total throughput of the fluid per unit time.

2. The flow meter according to claim 1, wherein the fluid flows through an entire cross section of said main channel and through an entire cross section of said at least one secondary channel.

3. The flow meter according to claim 1, wherein said at least one secondary channel is one of a plurality of secondary channels, which respectively have a smaller cross section than said main channel.

4. The flow meter according to claim 3, wherein a ratio of a sum of cross sections of all said plurality of secondary channels to a cross section of said main channel lies between 20:80 and 80:20.

5. The flow meter according to claim 1, wherein a ratio between a maximum diameter or wall spacing of said main channel to a minimum diameter or wall spacing of said secondary channel lies between 2.5 and 6.

6. The flow meter according to claim 1, wherein the measuring tube comprises a wall disposed to separate at least a first portion of said at least one secondary channel from said main channel.

7. The flow meter according to claim 6, wherein said wall which separates the first portion of the at least one secondary channel from the main channel is present along a part of the total measurement path, and wherein walls, which separate the secondary channels of the first part of said secondary channels from one another, are present in an initial section and an end section of the part of the measurement path, but are absent in an intermediate region.

8. The flow meter according to claim 6, wherein the initial section and the end sections have a length which is at least from 1.5 to 2 times a smallest cross-sectional dimension of the cross section of at least one secondary channel.

9. The flow meter according to claim 1, wherein at least a second part of the at least one secondary channel or all the plurality of secondary channels is or are configured as a radial gap adjacent said main channel or as an extension from said main channel.

10. The flow meter according to claim 1, wherein a cross-sectional shape of said at least one secondary channel widens from an outside inwardly toward said main channel.

11. The flow meter according to claim 1, wherein said main channel has substantially a same dimension in two predetermined mutually perpendicular directions.

12. The flow meter according to claim 11, wherein said main channel is arranged annularly symmetrically with respect to an axis of the flow meter, and said at least one secondary channel is one of a plurality of secondary channels distributed annularly around said main channel.

13. The flow meter according to claim 1, wherein at least a part of said at least one secondary channel has different dimensions in two different directions.

14. The flow meter according to claim 1, wherein at least a part of said at least one secondary channel has a cross section with a shape of a ring segment.

15. The flow meter according to claim 1, wherein said input device and said detection device are a pair of ultrasound transducers.

16. The flow meter according to claim 15, wherein part of said measurement path is provided at least in sections by a tube insert which has two attachments, each with an ultrasound-reflecting surface, configured to direct ultrasound from said transducers into said main channel.

17. The flow meter according to claim 1, wherein said input device is a magnetic field-generating electrical coil and said detection device is an electrode arrangement.

18. The flow meter according to claim 1, further comprising a filter for particles being a screen disposed in a inlet, said screen having openings that are smaller than or equally as large as a smallest cross-sectional dimension of said at least one secondary channel.

19. The flow meter according to claim 1, wherein said at least one secondary channel extends at least substantially over an entire length of said main channel.

20. The flow meter according to claim 1, wherein said main channel and said at least one secondary channel are formed in a one-piece component.

21. The flow meter according to claim 20, wherein said one-piece component is shaped conically in a longitudinal direction thereof.

22. The flow meter according to claim 20, wherein said one-piece component is a one-piece molded part having a mold release plane E extending through at least two secondary channels arranged opposite one another.

23. The flow meter according to claim 1, wherein the flow meter comprises a housing with an inner wall, and fluid is located in a region between said inner wall of said housing and an outer wall of the measuring tube comprising said main channel and said at least one secondary channel.

24. The flow meter according to claim 23, wherein said measuring tube comprises a circumferential collar-shaped projection for a housing connection on a rear side of said measuring tube.

25. The flow meter according to claim 1, wherein said measuring tube is enclosed by a measuring tube holder, said measuring tube holder comprising at least two longitudinal shells which fix said measuring tube and a plurality of reflectors.

26. The flow meter according to claim 25, wherein said measuring tube holder has at least one web disposed so as not to fluidically obstruct said at least one secondary channel.

* * * * *